Feb. 1, 1966 A. E. NEWTON 3,232,813
ADHESIVE PROCESSES
Filed Feb. 4, 1963
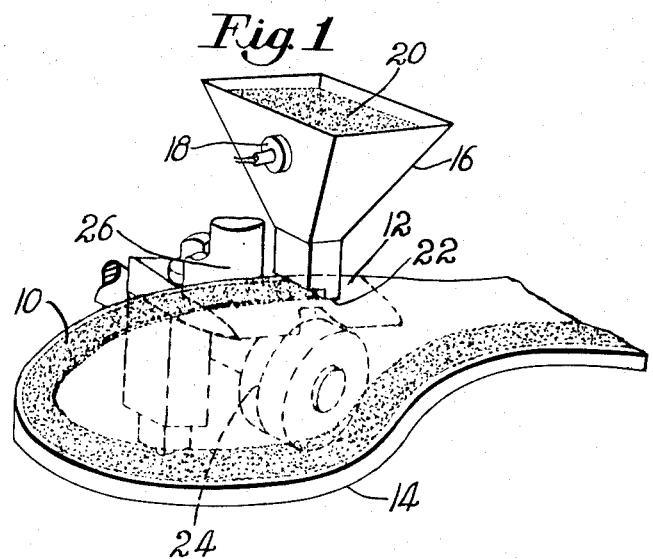
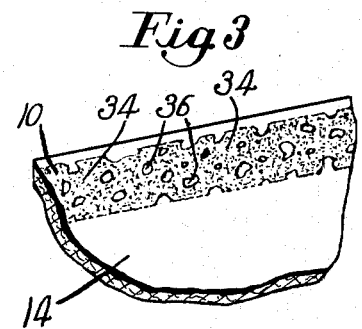
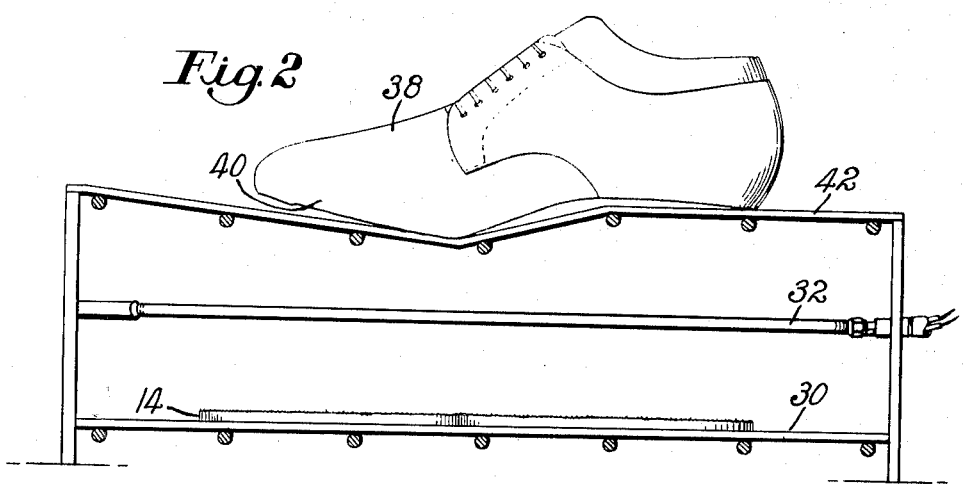
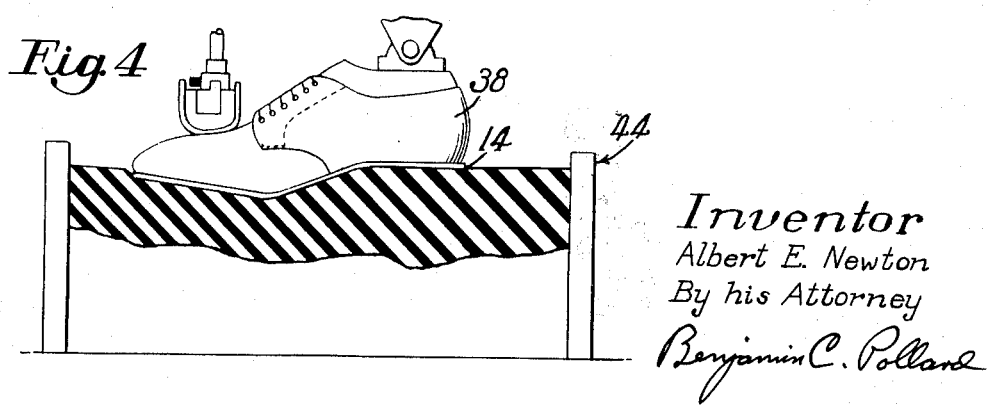
Inventor
Albert E. Newton
By his Attorney
Benjamin C. Pollard

United States Patent Office

3,232,813
Patented Feb. 1, 1966

3,232,813
ADHESIVE PROCESSES
Albert E. Newton, Beverly, Mass., assignor to United Shoe Machinery Corporation, Boston, Mass., a corporation of New Jersey
Filed Feb. 4, 1963, Ser. No. 255,813
3 Claims. (Cl. 156—320)

This invention relates to adhesive processes and particularly processes for the adhesive attachment of soles to shoe uppers.

Ordinarily the adhesive attachment of outsoles to shoe uppers involves applying adhesive, usually of rubber or synthetic rubber, as a volatile organic solvent solution to both the outsole and shoe upper, drying the adhesive and heat-activating the adhesive before assembling the outsole and upper. These adhesives have been satisfactory in their ability to wet and penetrate surfaces to be bonded. However, there is a time delay for drying the deposited adhesive and a distinct fire hazard both in the adhesive and in the solvent vapors given off from the deposited adhesive.

In the copending application of Conrad Rossitto entitled, "Adhesive Process," Serial No. 121,118 filed June 30, 1961, now U.S. Patent 3,168,754 of February 9, 1965, there is disclosed a process for bonding outsoles to uppers using a special hot-melt adhesive applied only to the outsole. This process has been found to give satisfactory attachment of outsoles to shoe uppers. A band of molten adhesive is applied to the outsole and thereafter the outsole with adhesive thereon and the bottom of the shoe are heated before assembly. It has been found that the adhesive must be applied in quantity in excess of that required in the final bond to insure effective wetting and allover engagement of the adhesive with the surfaces to be bonded. As a result when the surfaces are pressed together a certain amount of adhesive may be squeezed out beyond the joint. A further disadvantage results from the fact that, since adhesives having sufficient bonding strength have a high melting point, the relatively high temperatures required in melting for application involve the risk of breaking down the adhesive themselves. Additionally, because of the high temperature and the excess quantities of adhesive in certain applications the time required for hardening of the adhesive to strong bond retaining condition may be undesirably long.

It is an object of the present invention to provide a thermoplastic adhesive process enabling greater economy in the quantities of adhesive applied and superior speed of hardening to bond retaining condition.

It is a further object to provide a process in which only a single heating of the adhesive material is required.

To these ends and in accordance with a feature of the present invention there is provided an adhesive process in which fine particles of solid thermoplastic adhesive are applied to a surface to be bonded as a layer which may be brought to active adhesive condition by heat and which will possess the ability to wet and engage the surfaces to be bonded and thereafter set rapidly to a strong bond retaining condition.

The invention will be described further in connection with the attached drawings forming part of the disclosure of the present case in which:

FIG. 1 is a diagrammatic angular view with parts broken away of a device for applying a layer of adhesive particles to the attaching margin of an outsole;

FIG. 2 is a diagrammatic elevational view showing heating of the layer of adhesive on the outsole and the heating of a bottom of a shoe upper;

FIG. 3 is an enlarged view of a portion of an outsole showing the appearance of the adhesive layer after heating; and FIG. 4 is a diagrammatic elevational view showing the bonding of an outsole to an upper in a sole attaching press.

Although the present process is useful in a variety of relations to attach surfaces capable of withstanding the heat needed to bring the adhesive particles to active condition, for example, in the bonding of paper, the sealing of cartons and so one, the bonding of outsoles to shoe uppers, which is a particularly difficult problem, is described herein in detail. It is to be understood that the process is not, however, limited to the attachment of outsoles to shoe uppers.

In one form of the process of the present invention as illustrated in FIG. 1 a layer 10 of distinct, free particles of thermoplastic adhesive material is deposited on a surface such as the attaching marginal surface portions 12 of an outsole 14, as a layer of uniform thickness. A useful device for applying such a layer comprises a hopper 16 provided with an electrically driven vibrating device 18 to insure a uniform flow of particles from a body 20 of particles within the hopper to the discharge end 22 above the outsole surface portions 12. The outsole 14 is moved beneath the discharge end at a uniform rate by a drive wheel 24. A guide 26 is provided for maintaining the attaching marginal surface portions 12 of the outsole in desired relation to the discharge end 22. The deposited layer 10 of adhesive is relatively thin and may be of the order of about .002 pound to about 0.02 pound per square inch.

The adhesive used comprises distinct solid particles of one or more heat fusible resinous materials. The particle size is ordinarily not substantially larger than that size which will pass a 60 mesh standard sieve, and preferably is composed of particles capable of passing a 175 mesh sieve.

Resinous materials useful in the process are preferably high melting point linear polymer resin such as those employed in the process of the Rossitto application above referred to. These resins include the linear resinous polyesters or copolyesters of terephthalic acid and isophthalic acid with glycols of the series $H_2(CH_2)_nOH$, where $n$ is an integer greater than 1 but not exceeding 10. It has been found that the copolyesters of terephthalic acid and isophthalic acid in the molar ratio of from about 70:30 to about 90:10 with 1,4 butane diol are particularly satisfactory. Other heat softenable resins such as the polyamides, polystyrene and other vinyl polymer and copolymer resins, e.g. polyvinyl chloride may be used. Preferred resin will have a crystal melting temperature of from about 80° to about 200° C. and will harden to a strong tough condition at a temperature of at least about 50° C.

The preferred resinous materials have a molecular configuration wrich makes the resins readily crystallizable and work-orientable, that is, they are high molecular weight linear resins of which the constituent monomers are free from side chains. It is preferred that the resinous materials be at least partially in crystalline condition for greatest effectiveness in setting up rapidly in operation of the process.

After depostion of the layer 10 of adhesive particles on the attaching marginal surface portions 12 of the outsole 14, the adhesive layer on the outsole is placed on a rack 30 subjected to radiant heat from a radiant heating unit 32 as shown in FIG. 2. In the course of heating, the uppermost particles of the layer 10 fuse first and the fused material tends to bead up or agglomerate due to surface tension. In the course of agglomeration, the fused material carries with it underlying particles of adhesive so that the adhesive accumulated in raised areas of greater thickness than the thickness which would be obtained if the layer remained undisturbed (see FIG. 3). With leather soles agglomeration is controlled by the character of the leather and gives a particularly useful character to the layer of adhesive in that the raised areas areas 34 have increased thickness for entering into the irregularities in the bottom of a shoe upper to give improved wetting and adhesive engagement with the bottom of the shoe upper. The areas 36 from which adhesive has moved to the areas 34 are available to receive adhesive squeezed from areas 34 during assembly of the outsole 14 and a shoe upper 38. With other surfaces than leather, for example, with rubber or synthetic rubber composition outsoles it has been found in some instances that the degree of beading up or agglomeration of the resin particles in the course of heating may be more than is desired.

I have found that the informity of distribution of the adhesive layer 10 after heating may be improved by using as the adhesive a mixture of at least two components in spatially distinct relation where the two components are miscible in heat-softened condition and cooperate on cooling to form a strong solid solution. Resin mixtures useful in the present process are shown in the patent application of Walter H. Wedger entitled, "Methods of Bonding," Serial No. 86,131, filed January 31, 1961, now United States Letters Patent No. 3,076,214, granted February 5, 1963. As disclosed in that patent the components may include a fusible strong, usually high melting point component and a more readily fusible component usually a low melting point resin. The association of these may involve uniform mixing of the fine particles of the different components so that particles of one component are in close proximity to particles of a different component throughout the mass of the adhesive. Alternatively, the more readily fusible component may be adhered to or coated on particles of the high melting point component, provided that at least portions of the more readily fusible component remain in spaces distinct from the high melting point component. For example, coatings may be deposited on the high melting point particles from solution of the low melting component in volatile liquids in which the high melting component is not readily soluble.

When a layer of the mixed adhesive particles is subjected to heat, the more readily fusible component particles melt first and wet the surface to be attached, for example the outsole surface, and surfaces of the higher melting particles. Thus, the low softening point material acts between the higher softening point particles and wetted portions of the surface of the outsole to resist the force of surface tension tending to draw the as yet unfused particles into large globules.

Low melting point materials useful with the higher melting resins noted above may be thermoplastic or thermosetting resins. Among thermosetting resins, phenol aldehyde condensates, urea aldehyde condensates, melamine aldehyde condensates and epoxide resins may be used with addition of a curing agent or catalyst where the curring action is desired. These thermosetting resins are preferred because when heated rapidly they soften readily to a fluid condition which can wet and/or penetrate the surface to be bonded and aid in holding the particles of high melting component against undesired agglomeration. Also these resins may soften and aid in coalescence of the high melting point component. However, after curing these resins do not adversely affect the high melting point component but may improve the heat resistance of the bond.

Thermoplastic resins which may be used include the gasoline insoluble residue from the distillation of pine tar (Vinsol) or low molecular weight polystyrenes.

It is also possible to use more than one low melting component. A useful combination of low melting point resins is a mixture of particles of an acid catalyzed resorcinol formaldehyde resin in which less than an equivalent amount of formaldehyde has been condensed with the resorcinol, with an alkali catalyzed phenol formaldehyde resin in which the formaldehyde is combined in greater than the theoretical amount. The acid catalyzed resin is cured when heated in contact with the alkali catalyzed resin is cured when heated in contact with the alkali catalyzed resin so that it is not necessary to incorporate formaldehyde or further catalyst with either of the two resins.

The relative proportions of high melting and low melting components may vary considerably depending upon the bonding strength and operating conditions required. In general for outsole attaching there may be used from about 5% to about 20% by weight of the relatively low melting component with from 95% to 80% by weight of high melting component.

The extent of heating required to bring the layer 10 of adhesive to desired sole attaching condition will vary depending upon the particular adhesive material employed. In a preferred form of operation, the heating is carried out to a point where residual crystallites remain in the high melting component. That is, the conversion of a resinous material from amorphous state to crystalline state and from crystalline state to amorphous state requires time. Where the particles of adhesive in the layer 10 are crystalline at the time of application, rapid heating will convert surface portions of the adhesive layer to molten condition suitable for establishing a bond at a time prior to complete elimination of the crystal structure of the material so that there will be residual crystallites in the adhesive layer 10. These residual crystallites serve as nuclei on which crystals can grow when the outsole 14 and upper 38 are pressed together and the adhesive is allowed to cool so that crystallization and the development of strength is more rapid where such crystallites are present at the time of assembly.

On the other hand where the particles of the adhesive layer are amorphous before heating, they will melt at a somewhat lower temperature than the crystalline material and after assembly since there are no crystallite nuclei, the development of crystallinity and the high strength of a crystalline material takes significantly longer.

Completion of the sole attaching process involves heating of the sole attaching surfaces of the bottom 40 of the shoe upper by any conventional means, usually by disposing the upper on a rack 42 spaced from the heating unit 32 employed for action on the outsole 14. After heating of the bottom 40 of the shoe upper and heating of the layer 10 of adhesive and portions of the outsole 14 underlying the layer, the outsole 14 is positioned on the bottom 40 of the shoe upper. The assembled shoe upper 38 and outsole 14 are placed in a sole attaching press 44 (see FIG. 4) and subjected to sole attaching pressure. Pressure in the sole attaching press may be released in a matter of only a few seconds and the adhesive will hold the outsole 14 firmly on the shoe upper 38 after release of pressure. It is found that where the extent of heating of the layer of adhesive on the outsole is such as to leave residual crystallites in the layer, a superior bond immediately after release of pressure is obtained apparently due to the rapid crystallization of the adhesive on the layer. This factor is particularly valuable in the bonding of plasticized vinyl resin soles since the crystallized resin adhesives are less soluble in plasticizers and hence the adhesive layer is less subject to weakening by plasticizer from vinyl resin soles.

The above explanation of the desirable action of the adhesive is given as of possible assistance in understanding the invention; but it is to be understood that patentability is not based on the correctness of the theory advanced.

Although by proper selection of adhesive or adhesive mixture, natural or synthetic rubber outsole materials may be bonded as well as leather outsoles, it is also possible to employ a somewhat wider range of adhesives through providing a primer coat on the attaching surface of the outsole. Primers for natural or synthetic rubber outsoles may be used for example a solution of chlorinated rubber in a volatile organic solvent or may be a relatively stable polyisocyanate, for example, a polyarylene polyisocyanate commercially available as "PAPI."

The following examples are given as an aid in understanding the invention; but the invention is not restricted to the particular materials, proportions or procedural conditions employed in the examples.

*Example I*

A thermoplastic linear copolyester of 1,4 butane diol with isophthalic and terephthalic acid radicals in the ratio of 0.175 mol of isophthalic to 0.825 mol of terephthalic, having a melting point of about 194° C. was ground to a powder sufficiently fine to pass a 60 mesh standard sieve. A novolac type resorcinol formaldehyde resin having a softening point (Ball and Ring) of 103° to 112° C. was likewise ground to a fineness capable of passing a 60 mesh standard sieve. 15 parts of the resorcinol resin particles were blended uniformly with 85 parts by weight of particles of copolyester resin and the mixture was supplied to the hopper of a spreading device. A layer of the powdered adhesive mixture was applied to the attaching marginal surface portions of a synthetic rubber base composition outsole (Avonite).

The outsole was disposed with the adhesive layer exposed to a radiant heat source for 30 seconds. This radiant heat raised the temperature of the deposited layer of adhesive to an extent that the layer softened, became largely fluid and drew itself up into areas of greater thickness leaving areas of lesser thickness in the original area covered by the layer. Exact temperature of the adhesive layer could not be determined but appeared to be about 360° F. The bottom of a shoe upper was also exposed to radiant heat to raise the temperature of the attaching surface of the shoe upper to about 130° F. to about 140° F. The outsole was then "spotted" on the upper and the assembly placed in a sole attaching press. Pressure was applied on the assembly, and after 14 seconds the pressure was removed. On examination it was found that the sole was strongly attached to the shoe upper, that the edges of the sole were very "tight" to the upper and that there had been no squeeze-out of adhesive.

*Example II*

85 parts of the powdered copolyester resin and ten parts of the powdered resorcinol formaldehyde resin described in Example I were combined with 5 parts by weight of a heat hardenable alkali-catalyzed resinous condensation product of para-tertiarybutyl phenol with an excess over the equivalent amount of formaldehyde, this condensate having been ground to a fineness capable of passing a 60 mesh sieve. This resinous condensation product had a softening point (Ball and Ring) of 70° to 75° C. This powder mixture was used in the sole attaching procedure described in Example I. After removal from the press the sole was found to be strongly and tightly attached to the shoe upper.

*Example III*

A polyester was prepared by the reaction and condensation of 1,4-butane diol equimolar proportions of dimethylterephthalate and isophthalic acid. Condensation was carried out to form a resinous material having a melting point of about 350° F. (Ring and Ball). This resin was ground into particles passing a 60 mesh sieve (U.S. Bureau of Standards, Standard Screen Series).

100 parts by weight of these copolyester resin particles were combined with 150 parts by weight of a 1% solution in alcohol of the heat hardening phenolic resin used according to Example II and the mixture was spread in a layer and allowed to dry with stirring to deposit a coating of the heat hardening resin on the surface of the copolyester resin particles. The coated particles were used in a sole attaching operation following the procedure set forth in Example I. The layer of adhesive developed areas of greater thickness and areas of lesser thickness in the coarse of heating but a satisfactory distribution of adhesive in the attaching marginal area portions was retained. After assembly and pressing of the shoe and outsole and removal from the sole attaching press, the sole was found to be firmly attached to the shoe upper.

Having thus described my invention, what I claim as new and desire to secure by Letters Patent of the United States is:

1. The process of attaching an outsole to a shoe bottom comprising the steps of forming on a marginal attaching surface of the outsole, a thin layer of distinct free particles of at least two different heat fusible resinous materials in spatially distinct relation, said layer containing from about 0.002 to about 0.02 lbs. of said particles per square inch, said materials being at least partially miscible with each other in heat-softened condition for cooperation to form on cooling a strong, solid solution, one of said materials having a relatively high softening point and another of said materials having a relatively low softening point, said materials being evenly distributed in said layer in initially distinct but contacting spaces, said layer comprising from 80% to 95% of said high softening point material and from 20% to 5% by weight based on the weight of the mixture of said low softening point material, heating said layer by radient heat to soften the low softening point material to fluid condition in which it wets portions of said surface of the higher softening point particles and to soften the high softening point particles subsequent to the softening of the low softening point material, said fluid low softening point material acting between the higher softening point particles and said wetted portions of said surface to control the action of surface tension of the heated adhesive tending to draw the material into large globules, concurrently heating said shoe bottom, then bringing said outsole and said shoe bottom together with the layer of softened material between them, exerting pressure on the shoe and outsole to force the heat-softened material into intimate engagement with both the outsole and shoe bottom and cooling the material to establish rapidly a strong union of the outsole and shoe.

2. The process of attaching an outsole to a shoe bottom as defined in claim 1 in which said high softening point resinous material is an at least partially crystallized high molecular weight linear reaction product of terephthalic acid and isophthalic acid in the molar ratio of from about 70:30 to about 90:10 with a glycol of the series $HO(CH_2)_nOH$, (where $n$ is an integer greater than 1 but not exceeding 10), said polyester having a crystal melting temperature of from about 80° to about 200° C. and hardening to a strong tough condition at a temperature of at least about 50° C., and said low softening point material is at least one thermosetting resin selected from the group consisting of phenol aldehyde condensates, urea aldehyde condensates, melamine aldehyde condensates and epoxide resins.

3. The process of attaching an outsole to a shoe bottom as defined in claim 2 in which said glycol is 1,4-butane diol and said low softening point material is a thermosetting alkali-catalyzed resinous condensation product of para-tertiary butylphenol with an excess over the equivalent amount of formaldehyde.

(References on following page)

References Cited by the Examiner

UNITED STATES PATENTS

| | | | |
|---|---|---|---|
| 2,361,527 | 10/1944 | Bacon | 156—320 X |
| 2,683,100 | 7/1954 | Edgar. | |
| 2,732,324 | 1/1956 | Morris | 156—320 X |
| 2,765,251 | 10/1956 | Williams. | |
| 2,961,365 | 11/1960 | Sroog | 156—332 |
| 3,076,214 | 2/1963 | Wedger | 156—332 |
| 3,085,920 | 4/1963 | Taylor et al. | 156—332 X |
| 3,136,677 | 6/1964 | Woker | 156—332 X |

EARL M. BERGERT, *Primary Examiner.*